H. L. FISHER.
DRIVING GEAR FOR AUTOMOBILES.
APPLICATION FILED OCT. 10, 1917.

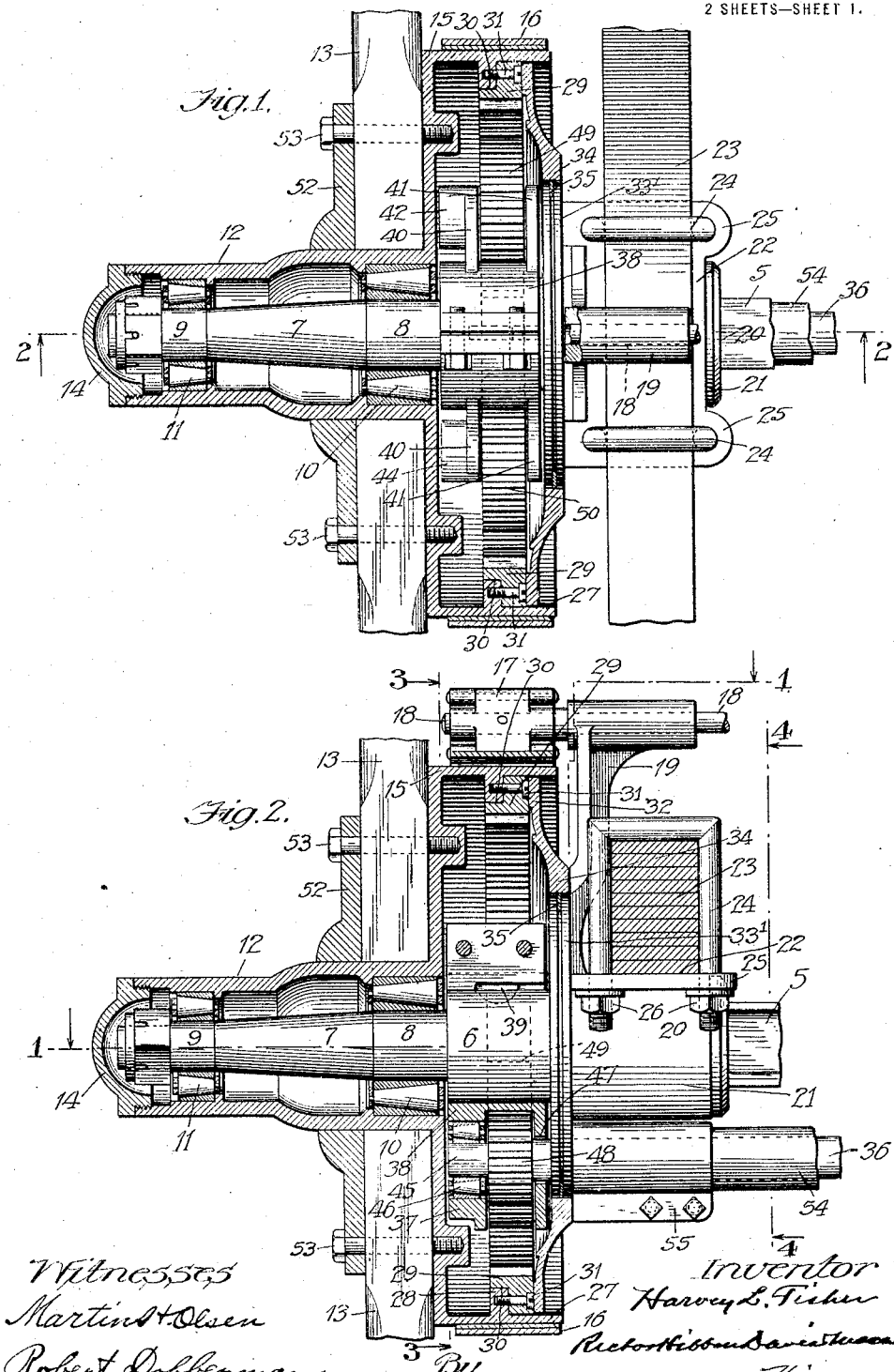

1,326,857.

Patented Dec. 30, 1919.
2 SHEETS—SHEET 2.

Witnesses
Martin H. Olsen.
Robert Dobberman.

Inventor
Harvey L. Fisher
By Rictor Hibben Davis
His Attys.

UNITED STATES PATENT OFFICE.

HARVEY L. FISHER, OF CHICAGO, ILLINOIS.

DRIVING-GEAR FOR AUTOMOBILES.

1,326,857.     Specification of Letters Patent.     Patented Dec. 30, 1919.

Application filed October 10, 1917. Serial No. 195,745.

*To all whom it may concern:*

Be it known that I, HARVEY L. FISHER, a citizen of the United States, residing at Chicago, in the county of Cook and State of Illinois, have invented certain new and useful Improvements in Driving-Gears for Automobiles, of which the following is a specification.

My invention relates more specifically to the means for transmitting power from the differential of the machine to the rear wheels thereof, the object being to provide simple and efficient mechanism for this purpose. In the accompanying drawings I have shown and in the following specification described in detail a preferred embodiment of my invention, but it will be understood that the specific disclosure is for the purpose of exemplification only, the scope of the invention being defined in the following claims in which I have endeavored to distinguish it from the prior art so far as known to me without, however, relinquishing or abandoning any portion or feature thereof.

Figure 3:
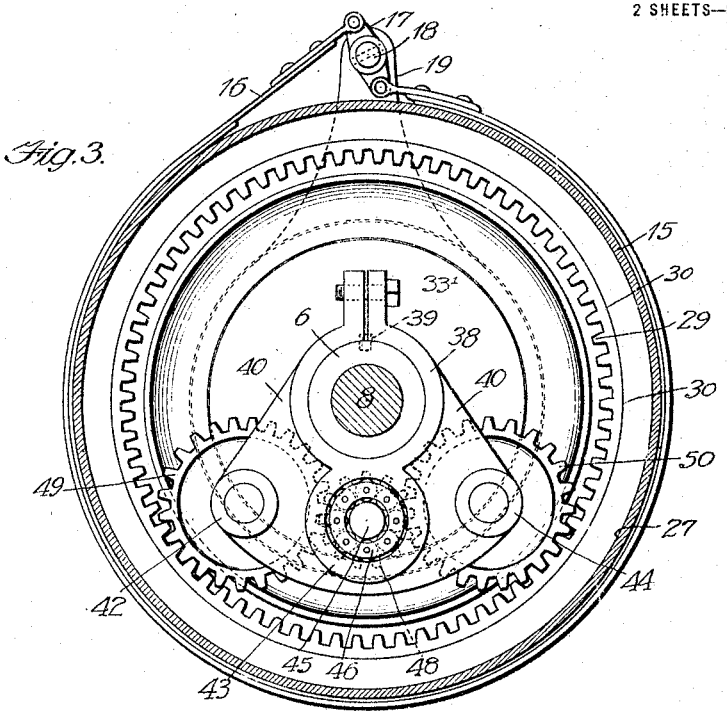
Figure 4:
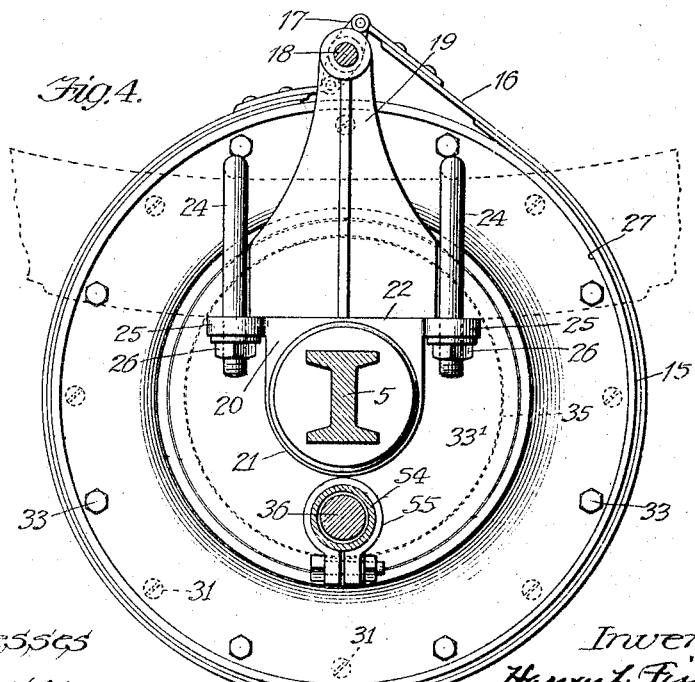

In the drawings Figure 1 is a horizontal section on the broken line 1—1 of Fig. 2, parts being shown in elevation; Fig. 2 is a vertical section on the line 2—2 of Fig. 1, parts being shown in elevation; Fig. 3 is a vertical transverse section on the line 3—3 of Fig. 2, and Fig. 4 a transverse vertical section on the line 4—4 of Fig. 2.

Each part is designated by the same reference character wherever it occurs in the several views.

The axle 5 is shown in the drawings in the form of an I-bar which is forged or otherwise provided at its ends, (of which one only is shown in the drawings, the other end being identical,) with cylindrical enlargements 6 and beyond the same with reduced portions 7 upon which the wheels are journaled. For this purpose each end of the axle is formed with cylindrical portions 8, 9, upon which roller bearings 10, 11, of any suitable or approved type are respectively mounted, said bearings receiving the hub 12 of the corresponding rear wheel of the machine, the spokes of which are shown at 13. At its outer end the hub 12 may be provided with a cap 14 and at its inner end is formed integral with a cylindrical casing 15 which incloses the power transmitting gearing and also forms a sheave or disk for the brake of the machine. The latter may be of any common or suitable type and is so shown as comprising a strap 16, the ends of which are connected to a lever 17 on shaft 18, which last is journaled in a bracket 19 forming part of a forging 20 secured to the axle 5. The means for turning the shaft 18 to control the brake may be of any suitable type which it is not thought essential to show or describe.

The forging 20 may be secured to the axle in any common or well-known way and comprises a barrel portion 21 embracing the I-beam body portion of the axle, the upper surface of which is substantially plane as at 22 to form a seat for the spring 23. The latter is secured to the forging by U-bolts 24, 24 of common type, the ends of which pass through ears 25, 25 on the forging and are supplied with nuts 26, 26. The internal periphery of the flange 27 of the casing is formed with a rib 28 to which is secured the internal gear or rack 29, the latter being shouldered as at 30 for the purpose and secured to said rib by screws 31. The end of the casing is closed and rendered dust proof by an annular cap 32 which is bolted at 33 to the rack and the internal opening of which is closed by the concentric flange or disk 33 formed on or secured to the forging 20 above described. The disk 33 and annulus 32 are formed at their meeting edges with a shoulder 34 to better guard against the penetration of dust and a packing washer 35 is interposed between the shoulders as a further means for excluding dust.

The internal gear is driven from a drive shaft 36 which is one of a pair of such shafts driven from a differential which it is unnecessary to show or describe. The drive shaft 36 extends through a suitable opening in the disk 33 and is journaled within the casing in a bracket or hanger 37 having a collar or hub 38 surrounding and keyed to the enlargement 6 of the axle as at 39. The hanger also comprises a pair of webs or plates 40, 41, suitably spaced apart as shown more particularly in Fig. 1, web 40 being formed with bosses 42, 43, 44 for a purpose which will appear. The boss 43 forms a bearing for the end 45 of the drive shaft 36, a roller bearing 46 of suitable character being interposed between the shaft and the interior bore of said boss. The web 41 is perforated as at 47 in axial alinement with the boss 43 for the passage of the power shaft 36. Between the webs 40, 41 there is secured upon the drive shaft 36 a pinion 48 which is in mesh with pinions 49, 50 journaled respectively on opposite sides of pinion 48 in the bosses 42, 44 and located between the webs 40, 41. Pinions 49, 50 engage pinion 48 and also the internal rack or gear 29 which it is their function to drive.

The spokes of the wheel are shown as held in position between an annulus 52 and the exterior of the casing 15 by bolts 53.

Shaft 36 is surrounded by a tubular casing 54, the end of which abuts against the disk 33 and is provided with a clamp collar 55 which may be adjusted to fit tightly against the disk to prevent the entrance of dust at this point.

By means of the construction shown and described any desired gear reduction may be employed between the drive shaft and the internal gear and said shaft being brought nearer the axle of the machine the differential housing and shaft casings reinforce the axle. Furthermore, the location of the drive shaft near the center of the casing 15 permits the employment of the broad annular closure 32 and the small central disk 22 supplementing the same, thus materially decreasing the perimeter of the joint between said stationary disk and the casing, thereby reducing the chance for the entry of dust and the like. Furthermore, the broad annular closure, which may be secured liquid tight against the internal gear permits the maintenance of a pool of oil within the gear casing in which the gears run.

I claim:

1. In a device of the class described, an axle, a wheel journaled on the end thereof, a gear casing thereon, an internal gear in said casing, a hanger secured to the axle within the casing, a drive shaft journaled at its end in the hanger, a pinion on the drive shaft, and gearing intermediate the pinion and said internal gear.

2. In a device of the class described, an axle, a wheel journaled on the end thereof, a gear casing on the wheel, an internal gear in said casing, a hanger secured to the axle within the casing, a drive shaft journaled in the hanger, a pinion on the drive shaft, and a gear also journaled in said hanger and engaging said pinion and internal gear.

3. In a device of the class described, an axle, a wheel journaled on the end thereof, a gear casing on the wheel, an internal gear in said casing, a hanger secured to the axle within the casing, a drive shaft journaled in the hanger, a pinion on the drive shaft, and a pair of gears mounted respectively on opposite sides of said pinion and engaging said internal gear.

4. In a device of the class described, an axle, a wheel journaled on the axle, a gear casing carried by the wheel, an internal rack within the casing, a hanger secured to the axle within the casing, a drive shaft journaled at one end in the hanger, a pinion mounted on the drive shaft, and a pair of gears mounted respectively on opposite sides of the pinion and engaging the same and the internal rack, said hanger comprising a pair of webs between which said pinion and gears are journaled.

5. In a device of the class described, a stationary axle having a bearing on the end thereof, a wheel mounted on the bearing, a casing mounted on the wheel, an internal rack secured within the casing, an annulus closing one end of the casing, a disk mounted on the axle and closing the opening of the annulus, a hanger mounted on the axle within the casing, a drive shaft journaled in the hanger, a pinion on the drive shaft and gearing between the pinion and the internal rack.

6. In a device of the class described, an axle, a wheel journaled on the end of the axle, a casing carried by the wheel on the inner side thereof, an internal gear in said casing, a journal bearing carried on said axle within the casing, a jack-shaft journaled in said bearing, a gear on said jack-shaft in the plane of the internal gear, and an idler gear between the gear on the jack-shaft and the internal gear.

7. In a device of the class described, a stationary axle, a wheel comprising a hub journaled on the end of the axle, a casing inside the wheel integral with said hub, an internal gear within the casing, a drive shaft, a bearing for the end of the drive shaft supported by the axle within the casing, a pinion on the drive shaft, and an idler between said pinion and internal gear.

8. In a device of the class described, a fixed axle, a wheel comprising a hub journaled on the axle, a casing on the wheel having its outer side closed and its inner side open whereby the wheel and casing may be removed together over the end of the axle, an internal gear mounted in the casing, detachable means for closing the open side of the casing, a support on the axle, a jack-shaft the end whereof is journaled in the support on the axle, a pinion on the jack-shaft, and an idler carried by the support and engaging said pinion and internal gear.

HARVEY L. FISHER.